Figure 1:
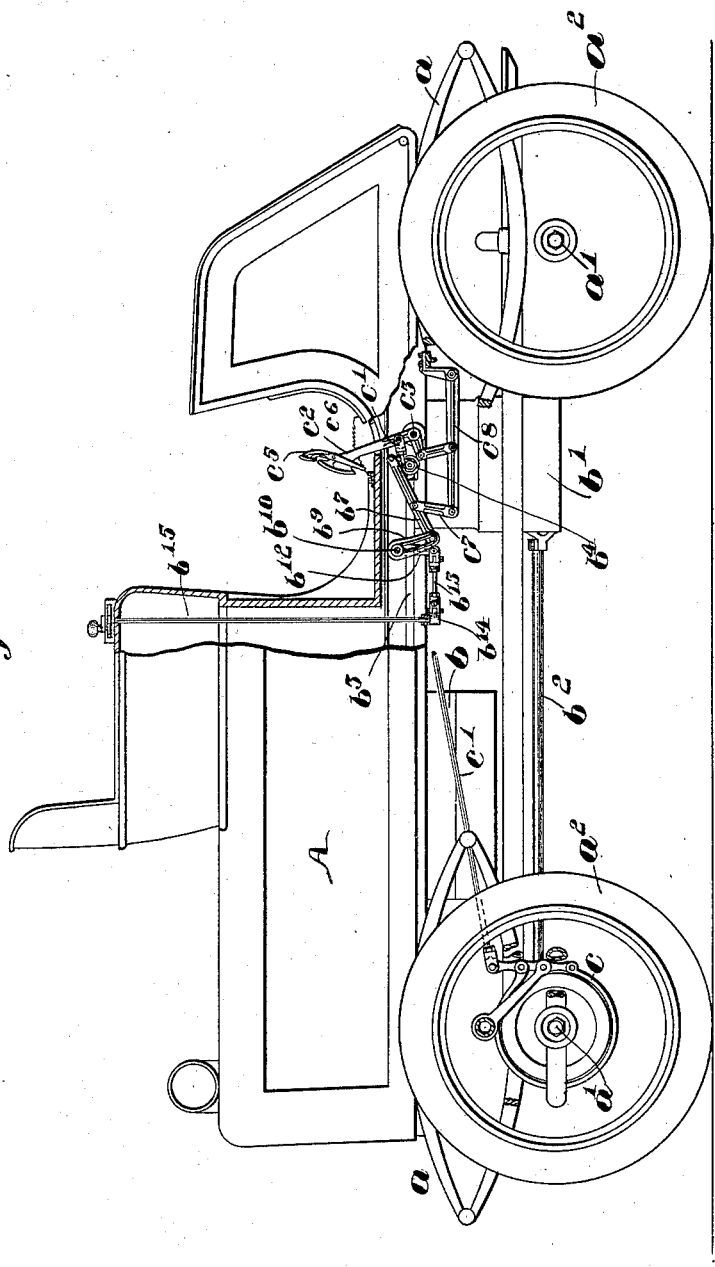

No. 719,806. PATENTED FEB. 3, 1903.
D. E. JOHNSON.
CONTROLLING MEANS FOR MOTOR VEHICLES.
APPLICATION FILED APR. 11, 1902.
NO MODEL. 3 SHEETS—SHEET 1.

Witnesses:
Edwin T. Luce
Thomas B. Booth

Inventor:
Daniel E. Johnson,
by Frederick L. Emery
Atty.

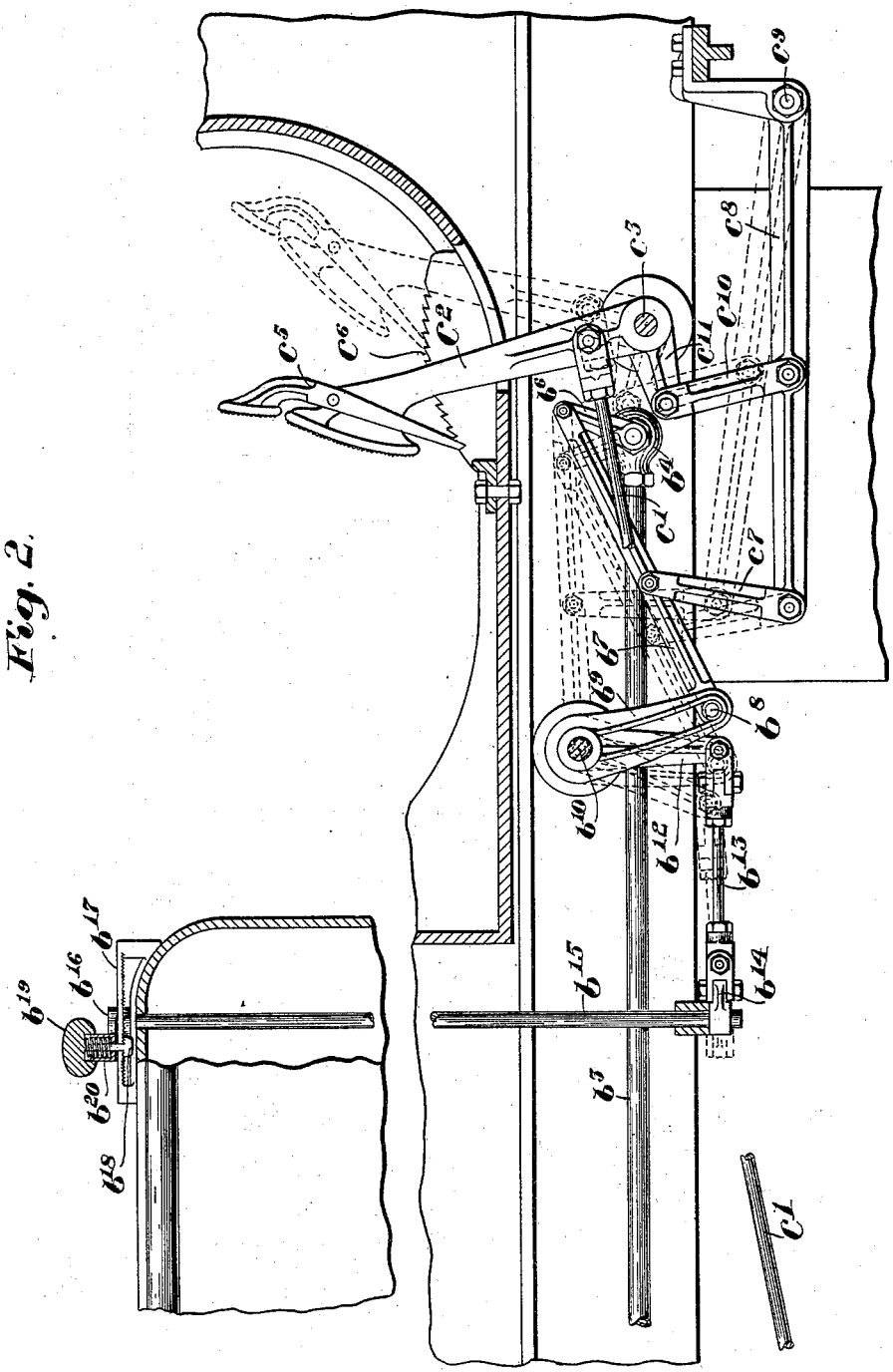

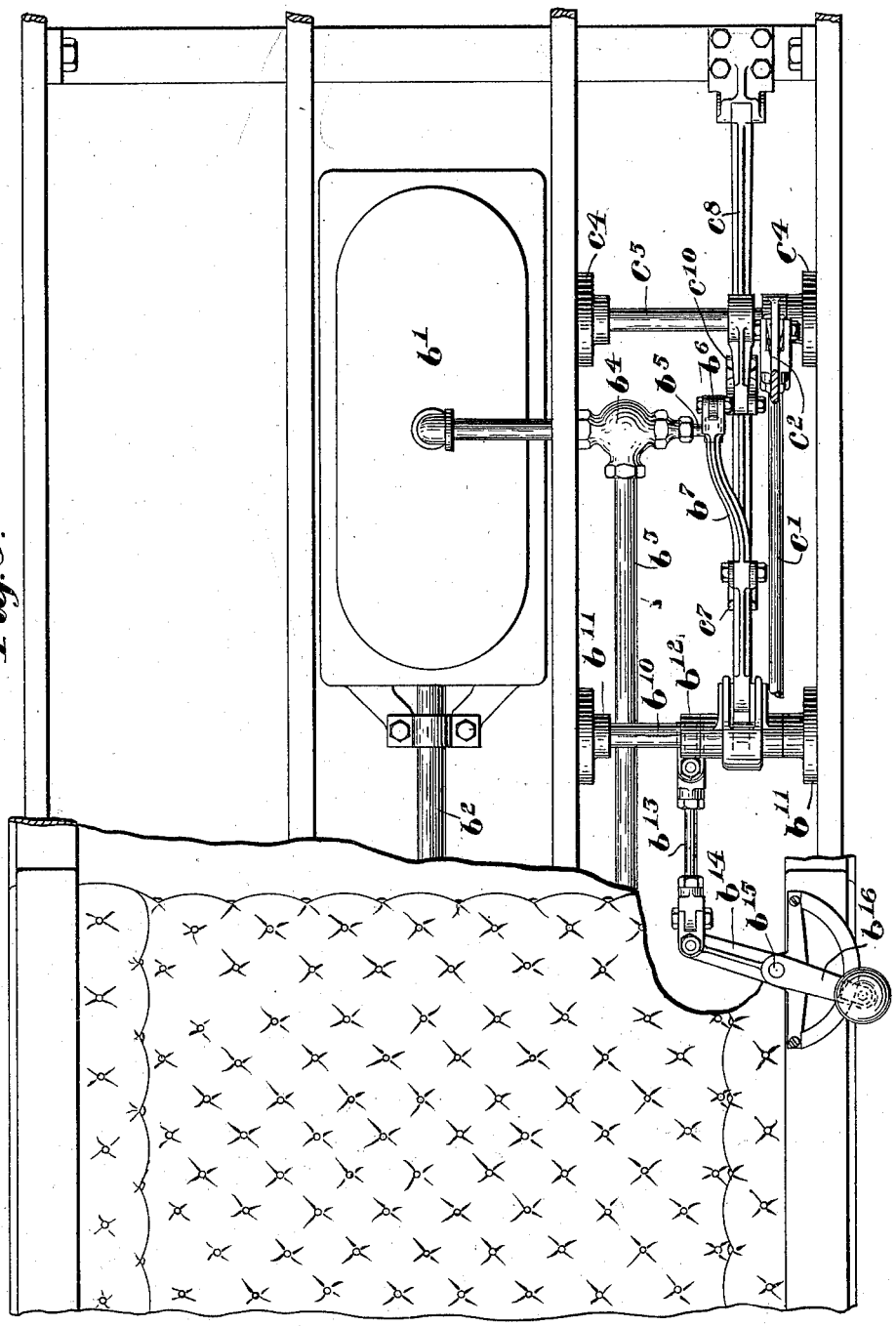

UNITED STATES PATENT OFFICE.

DANIEL E. JOHNSON, OF HARTFORD, CONNECTICUT, ASSIGNOR TO FREDERIC C. BILLINGS, OF HARTFORD, CONNECTICUT.

CONTROLLING MEANS FOR MOTOR-VEHICLES.

SPECIFICATION forming part of Letters Patent No. 719,806, dated February 3, 1903.

Application filed April 11, 1902. Serial No. 102,430. (No model.)

*To all whom it may concern:*

Be it known that I, DANIEL E. JOHNSON, a citizen of the United States, residing at Hartford, in the county of Hartford and State of Connecticut, have invented an Improvement in Braking and Motive-Power-Controlling Means for Motor-Vehicles, of which the following description, in connection with the accompanying drawings, is a specification, like letters on the drawings representing like parts.

This invention in motor-vehicles aims to provide means for controlling the vehicle-brake and the motive-power-regulating means from one and the same controlling member or means whereby application of the brake is always accompanied with reduction of applied motive power, and, vice versa, release of the brake is accompanied with increase of applied motive power. This controlling means may conveniently be a foot-operated lever, such as the usual brake-lever, which may thus be employed for the entire control of the starting, stopping, and speed of the vehicle, leaving the hands entirely free for manipulation of the steering and alarm-sounding devices of the vehicle.

My invention will be best understood from a description of one embodiment thereof selected for illustrative purposes.

In the accompanying drawings, Figure 1, in side elevation, partially broken away, shows a typical motor-vehicle equipped with devices illustrating my invention. Fig. 2, in a partially-sectional elevation, shows, on an enlarged scale, the operating mechanism, Fig. 1; and Fig. 3, a top or plan view of Fig. 2.

In the particular embodiment of my invention shown in the drawings the vehicle-body A, hung upon usual springs $a\,a$, resting upon axles $a'\,a'$, provided with usual wheels $a^2\,a^2$, the motive-power appliances—such as the steam-generator $b$, engine $b'$, operating through the shaft $b^2$ to drive the rear or driving axle and its wheels, and the brake $c$ and its operating-rod $c'$—are and may be of any usual or desired type or construction so far as my present invention is concerned, for any kind of motive power and braking appliance may be used.

Referring particularly to Fig. 2, the brake-operating rod $c'$ is shown connected to a usual foot-operated brake-controlling member $c^2$, fulcrumed at $c^3$ on a short shaft, Fig. 3, mounted in suitable bearings $c^4$ on the body. At its upper end said brake-controlling member $c^2$ is preferably provided with means, as the pivoted dog $c^5$, coöperating with the toothed sector $c^6$, to retain said controlling member in any position into which it may be moved. This dog may be released to free the controlling member by a slight forward tipping movement of the foot upon the controlling member. Steam from the generator is conducted to the engine through a pipe $b^3$, Figs. 2 and 3, in which is introduced a suitable throttle-valve $b^4$. The throttle shown is opened and closed by rotation of its stem $b^5$, said stem having fast upon it an operating-arm $b^6$. This arm is connected at its free end to one end of the rod $b^7$, carrying at its other end a shifting block $b^8$ in the link $b^9$. This link is composed of two like slotted members which receive between them the block $b^8$ and the end of the rod $b^7$, said link members being yoked together at their upper ends and made fast to and as a part of the rock-shaft $b^{10}$, mounted in bearings $b^{11}$ on the body. This same rock-shaft has a depending arm $b^{12}$, connected by the universally-jointed rod $b^{13}$ with the arm $b^{14}$ on the lower end of the vertical shaft $b^{15}$. This vertical shaft is suitably mounted on the body and at its upper end is provided with means, as the handle-arm $b^{16}$, for rotating it more or less, thereby to rock the link $b^9$ and through the link-block and its rod likewise rotate the throttle-stem and admit steam to the engine or cut off the steam therefrom.

To aid in controlling the handle-lever $b^{16}$, I have provided the same with a fixed sector $b^{17}$, toothed at its under side for engagement by the latch-block $b^{18}$ on the spring-controlled depressible knob or handle $b^{19}$. Depression of the handle against the spring $b^{20}$ disengages the latch-block from said sector and permits of free movement of said handle in either direction. Release of said handle from the pressure of the hand permits the said latch-block instantly to engage the sector and lock the handle-lever in position. Any other desired throttle actuating or controlling means may be employed than the one shown so far as my invention is concerned.

To shift the link-block $b^8$ in the link $b^9$, there is connected with the link-block rod $b^7$ a lifting-rod $c^7$, jointed at its lower end to one end of the long lever $c^8$, fulcrumed at $c^9$ on a bracket carried by the body. This long lever $c^8$ also is connected by a rod $c^{10}$ with an arm $c^{11}$ on the brake-shaft $c^3$. The length of the link-block rod $b^7$ and the fixed position of the rock-shaft $b^{10}$ are such that shifting the link-block from the bottom to the top of the link $b^9$ will always throw the throttle-arm $b^6$ to the right into its full-line position, closing the throttle-valve and cutting off the steam from the engine. Thus whatever be the position of the handle-lever $b^{16}$, link $b^9$, and throttle-arm $b^6$—i. e., whatever be the speed at which the vehicle is running—if the operator with his foot pushes the brake-lever forward into or toward its dotted position, Fig. 2, to apply the brake he thereby, through the short arm $c^{11}$ on the brake-shaft, lifts the lever $c^8$ and link-block rod $b^7$ into their elevated position, shifting the link-block into its highest dotted position coincident with the axis of the rock-shaft $b^{10}$, thus automatically closing the throttle-valve and cutting off the motive power simultaneously with the application of the brake. When the brake is released and its foot-lever $c^2$ is returned to its normal full-line position, Fig. 2, the link-block is dropped to the bottom of the link, the link having remained unmoved, thus again opening the throttle-valve to precisely the position it was in before the brake was applied, and whatever the movement of the brake-lever there is a corresponding appropriate movement of the throttle. For example, an emergency application of the brake completely and promptly cuts off the steam, gradual application of the brake gradually cuts off the steam and partial application of the brake only partially cuts off the steam; but the maximum opening of the throttle by the brake-lever operating through the link-block at the lower end of the link is in every case limited by the position of the link determined by the position of the handle-lever $b^{16}$ at the side of the operator. Between this maximum opening and the closed position of the throttle determined by the handle lever and link the supply of steam to the engine may be wholly controlled by the brake-lever, as described. Thus whether running at high speed with a throttle wide open or threading one's way along a crowded city street with the throttle nearly closed the operator may employ both his hands for steering, signaling, &c., and control the speed of his vehicle, whether to stop, slow down, or start, wholly by movement of the brake-controlling member, operated usually by the foot.

Obviously the throttle is always directly under the control of the handle-lever, to be operated thereby wholly independent of the brake-lever. This is desirable not only to enable the operator while running to vary the maximum opening of the throttle, but also to enable him upon coming to a stop to completely close the throttle and avoid accidental starting should the brake-lever be unintentionally released.

It will be noticed that the throttle may be controlled at will from the handle-lever $b^{16}$ without affecting the brake, but that no movement of the brake-lever can be had to apply the brake without correspondingly cutting off the supply of motive power.

My invention is not limited to the particular embodiment thereof here shown, for obviously the same may be varied within the spirit and scope of the invention.

I claim—

1. A motor-vehicle containing power-governing means for governing the application of motive power to the vehicle, means for controlling the same, and separately-operated braking means for the vehicle adapted respectively to cut off and on the power rendered available by the controlling means upon application and release of the brake.

2. A motor-vehicle containing power-governing means for governing the application of motive power to the vehicle, means for controlling the same, and separately-operated braking means for the vehicle adapted respectively to cut off and on the power rendered available by the controlling means upon application and release of the brake and to vary the same proportionately to the movement of the braking means.

3. A motor-vehicle containing means for governing the application of motive power to the vehicle, means for controlling the same, and separate foot-actuated means adapted to cut off and on the power rendered available by the controlling means to vary the speed of the vehicle.

4. A motor-vehicle containing braking means, motive-power-governing means connected therewith and operated thereby, and means independent of said braking means to limit the extent of operation of said governing means by said braking means.

5. A motor-vehicle containing motive-power-governing means including a longitudinally-movable member, as $b^7$, with manual means to move it in one, a longitudinal direction, to govern the application of motive power and braking means connected with and to move said member in another, a transverse direction, also to govern the application of said motive power.

6. A motor-vehicle containing braking means, motive-power-governing means connected therewith and operated thereby both to cut off and to apply the motive power, and locking means for said braking means.

7. A motor-vehicle containing motive-power-governing means having manual operating devices, including a rocking link and its link-block and braking means connected with and adapted on operation to shift said link-block to operate said governing means independently of said manual operating devices.

8. In a motor-vehicle a steam-generator, its throttle-valve, a link and its link-block connected with said throttle-valve, a hand-lever to rock said link, a brake and its actuating-lever, and connections between said brake-actuating lever and link-block for shifting the latter on movement of the former for the purpose described.

9. A steam-motor vehicle containing a steam-engine, a throttle therefor, manual means controlling said throttle, and separately-operated braking means for the vehicle adapted respectively to cut off and on the power rendered available by said manual controlling means upon application and release of the brake.

10. In a steam-motor vehicle, a steam-engine, a throttle, a controller therefor, braking means for said vehicle, and connections between said braking means and throttle to cause the latter to have a movement corresponding to the movement of said braking means when said controller is in its on position but to have no movement when said controller is in its off position.

11. A steam-motor vehicle containing a steam-engine, a throttle therefor, manual means for controlling said throttle to render a predetermined amount of power available for the propulsion of said vehicle, and separably-operated braking means for the vehicle adapted respectively to cut off and on the power rendered available by said manually-controlled means upon application and release of the brake, and to vary the same proportionately to the movement of said braking means.

In testimony whereof I have signed my name to this specification in the presence of two subscribing witnesses.

DANIEL E. JOHNSON.

Witnesses:
ELIZABETH HEYWOOD,
E. H. STOCKER.